(12) United States Patent
Chis et al.

(10) Patent No.: US 10,452,877 B2
(45) Date of Patent: Oct. 22, 2019

(54) METHODS TO COMBINE AND AUTO-CONFIGURE WIEGAND AND RS485

(71) Applicant: ASSA ABLOY AB, Stockholm (SE)

(72) Inventors: Flaviu Cristian Chis, Leander, TX (US); Bryan Stephen Holloway, Edgewater, CO (US); John Frame, Westminster, CO (US)

(73) Assignee: ASSA ABLOY AB, Stockholm (SE)

( * ) Notice: Subject to any disclaimer, the term of this patent is extended or adjusted under 35 U.S.C. 154(b) by 0 days.

(21) Appl. No.: 15/839,578

(22) Filed: Dec. 12, 2017

(65) Prior Publication Data

US 2018/0173907 A1 Jun. 21, 2018

Related U.S. Application Data

(60) Provisional application No. 62/435,506, filed on Dec. 16, 2016.

(51) Int. Cl.
*E05F 15/77* (2015.01)
*G06K 7/10* (2006.01)
(Continued)

(52) U.S. Cl.
CPC ......... *G06K 7/10297* (2013.01); *G06F 21/34* (2013.01); *G06K 7/10198* (2013.01); *G06K 7/10465* (2013.01); *G07C 9/00111* (2013.01)

(58) Field of Classification Search
CPC ........... G06K 7/10198; G06K 7/10207; G06K 7/10217; G06K 7/10227; G06K 7/10465;
(Continued)

(56) References Cited

U.S. PATENT DOCUMENTS

| 3,694,757 A | 9/1972 | Hanna, Jr. |
| 3,842,350 A | 10/1974 | Gross |

(Continued)

FOREIGN PATENT DOCUMENTS

| AU | 2004100358 | 6/2004 |
| CN | 1307309 | 8/2001 |

(Continued)

OTHER PUBLICATIONS

"Access Control Standard for the 26-Bit Wiegand Reader Interface," Security Industry Association, Oct. 17, 1996, 15 pages.

(Continued)

*Primary Examiner* — Edwin C Holloway, III
(74) *Attorney, Agent, or Firm* — Schwegman Lundberg & Woessner, P.A.

(57) ABSTRACT

An access control reader includes a credential interface and a network interface. The access control reader includes a processor coupled to the credential interface and the network interface and computer memory coupled with the processor and comprising instructions that are executable by the processor. The instructions comprise instructions to determine that the access control reader has been connected to a power source, and instructions to monitor activity at the credential interface after the access control reader has been connected to the power source. The instructions comprise instructions that cause the access control reader to enter either a first mode of operation or a second mode of operation dependent upon whether or not activity is detected at the credential interface within a threshold amount of time after the access control reader has been connected to the power source.

20 Claims, 8 Drawing Sheets

(51) Int. Cl.
  *G07C 9/00* (2006.01)
  *G06F 21/34* (2013.01)
  *E05F 15/681* (2015.01)
  *G01S 19/14* (2010.01)

(58) Field of Classification Search
  CPC .. G06K 7/10475; G06F 21/34; G07C 9/00111
  USPC .............................................. 340/10.5, 5.71
  See application file for complete search history.

(56) References Cited

U.S. PATENT DOCUMENTS

| | | |
|---|---|---|
| 4,087,626 A | 5/1978 | Brader |
| 4,163,215 A | 7/1979 | Iida |
| 4,333,072 A | 6/1982 | Beigel |
| 4,425,645 A | 1/1984 | Weaver et al. |
| 4,519,068 A | 5/1985 | Krebs et al. |
| 4,549,264 A | 10/1985 | Carroll et al. |
| 4,656,463 A | 4/1987 | Anders et al. |
| 4,688,026 A | 8/1987 | Scribner et al. |
| 4,849,927 A | 7/1989 | Vos |
| 5,013,898 A | 5/1991 | Glasspool |
| 5,028,918 A | 7/1991 | Giles et al. |
| 5,041,826 A | 8/1991 | Milheiser |
| 5,050,150 A | 9/1991 | Ikeda |
| 5,151,684 A | 9/1992 | Johnsen |
| 5,166,676 A | 11/1992 | Milheiser |
| 5,187,676 A | 2/1993 | DeVane |
| 5,193,115 A | 3/1993 | Vobach |
| 5,218,344 A | 6/1993 | Ricketts |
| 5,235,326 A * | 8/1993 | Beigel .................... G01V 15/00 340/10.34 |
| 5,235,642 A | 8/1993 | Wobber et al. |
| 5,258,936 A | 11/1993 | Gallup et al. |
| 5,343,469 A | 8/1994 | Ohshima |
| 5,347,263 A | 9/1994 | Carroll et al. |
| 5,357,528 A | 10/1994 | Alon et al. |
| 5,396,215 A | 3/1995 | Hinkle |
| 5,420,928 A | 5/1995 | Aiello et al. |
| 5,426,425 A | 6/1995 | Comad et al. |
| 5,446,683 A | 8/1995 | Mullen et al. |
| 5,467,082 A | 11/1995 | Sanderson |
| 5,491,471 A | 2/1996 | Stobbe |
| 5,517,172 A | 5/1996 | Chiu |
| 5,519,381 A | 5/1996 | Marsh et al. |
| 5,521,602 A | 5/1996 | Carroll et al. |
| 5,533,128 A | 7/1996 | Vobach |
| 5,541,996 A | 7/1996 | Ridenour |
| 5,577,124 A | 11/1996 | Anshel et al. |
| 5,594,384 A | 1/1997 | Carroll et al. |
| 5,600,324 A | 2/1997 | Reed et al. |
| 5,600,683 A | 2/1997 | Bierach et al. |
| 5,608,801 A | 3/1997 | Aiello et al. |
| 5,679,945 A | 10/1997 | Renner et al. |
| 5,680,131 A | 10/1997 | Utz |
| 5,686,904 A | 11/1997 | Bruwer |
| 5,696,909 A | 12/1997 | Wallner |
| 5,724,417 A | 3/1998 | Bartholomew et al. |
| 5,745,037 A | 4/1998 | Guthrie et al. |
| 5,751,808 A | 5/1998 | Anshel et al. |
| 5,754,603 A | 5/1998 | Thomas et al. |
| 5,777,561 A | 7/1998 | Chieu et al. |
| 5,802,176 A | 9/1998 | Audebert |
| 5,825,882 A | 10/1998 | Kowalski et al. |
| 5,844,990 A | 12/1998 | Kokubu et al. |
| 5,848,541 A | 12/1998 | Glick et al. |
| 5,886,894 A | 3/1999 | Rakoff |
| 5,887,176 A | 3/1999 | Griffith et al. |
| 5,909,462 A | 6/1999 | Kamerman et al. |
| 5,923,264 A | 7/1999 | Lavelle et al. |
| 5,929,779 A | 7/1999 | MacLellan et al. |
| 5,952,922 A | 9/1999 | Shober |
| 5,952,935 A | 9/1999 | Mejia et al. |
| 5,954,583 A | 9/1999 | Green |
| 5,991,410 A | 11/1999 | Albert et al. |
| 5,995,956 A | 11/1999 | Nguyen |
| 6,044,388 A | 3/2000 | DeBellis et al. |
| 6,052,786 A | 4/2000 | Tsuchida |
| 6,078,251 A | 6/2000 | Landt et al. |
| 6,078,888 A | 6/2000 | Johnson, Jr. |
| 6,079,018 A | 6/2000 | Hardy et al. |
| 6,084,977 A | 7/2000 | Borza |
| 6,097,307 A | 8/2000 | Utz |
| 6,154,544 A | 11/2000 | Farris et al. |
| 6,181,252 B1 | 1/2001 | Nakano |
| 6,182,214 B1 | 1/2001 | Hardjono |
| 6,192,222 B1 | 2/2001 | Greeff et al. |
| 6,212,175 B1 | 4/2001 | Harsch |
| 6,219,439 B1 | 4/2001 | Burger |
| 6,223,984 B1 | 5/2001 | Renner et al. |
| 6,249,212 B1 | 6/2001 | Beigel et al. |
| 6,249,866 B1 | 6/2001 | Brundrett et al. |
| 6,259,367 B1 | 7/2001 | Klein |
| 6,272,562 B1 | 8/2001 | Scott et al. |
| 6,285,681 B1 | 9/2001 | Kolze et al. |
| 6,285,761 B1 | 9/2001 | Patel et al. |
| 6,304,613 B1 | 10/2001 | Koller et al. |
| 6,307,517 B1 | 10/2001 | Lee |
| 6,314,440 B1 | 11/2001 | O'Toole et al. |
| 6,317,027 B1 | 11/2001 | Watkins |
| 6,325,285 B1 | 12/2001 | Baratelli |
| 6,366,967 B1 | 4/2002 | Wagner |
| 6,377,176 B1 | 4/2002 | Lee |
| 6,411,199 B1 * | 6/2002 | Geiszler ................ G06K 7/0008 340/10.1 |
| 6,420,961 B1 | 7/2002 | Bates et al. |
| 6,483,427 B1 | 11/2002 | Werb |
| 6,487,176 B1 | 11/2002 | Lehmann |
| 6,496,595 B1 | 12/2002 | Puchek et al. |
| 6,496,806 B1 | 12/2002 | Horwitz et al. |
| 6,509,828 B2 | 1/2003 | Bolavage et al. |
| 6,542,608 B2 | 4/2003 | Scheidt et al. |
| 6,587,032 B2 | 7/2003 | Armingaud |
| 6,606,386 B2 | 8/2003 | Scheidt et al. |
| 6,608,901 B2 | 8/2003 | Scheidt et al. |
| 6,617,962 B1 | 9/2003 | Horwitz et al. |
| 6,677,852 B1 * | 1/2004 | Landt .................... G06K 7/0008 235/375 |
| 6,691,141 B2 | 2/2004 | Schmidt |
| 6,717,516 B2 | 4/2004 | Bridgelall |
| 6,718,038 B1 | 4/2004 | Cusmario |
| 6,724,296 B1 | 4/2004 | Hikita et al. |
| 6,810,123 B2 | 10/2004 | Farris et al. |
| 6,885,747 B1 | 4/2005 | Scheidt et al. |
| 6,903,656 B1 | 6/2005 | Lee |
| 6,922,558 B2 | 7/2005 | Delp et al. |
| 6,931,533 B2 | 8/2005 | Roberts |
| 6,944,768 B2 | 9/2005 | Siegel et al. |
| 6,947,560 B1 | 9/2005 | Smeets et al. |
| 6,963,270 B1 | 11/2005 | Gallagher, III et al. |
| 6,988,203 B2 | 1/2006 | Davis et al. |
| 6,992,567 B2 | 1/2006 | Cole et al. |
| 7,016,925 B2 | 3/2006 | Schmidt |
| 7,026,935 B2 | 4/2006 | Diorio et al. |
| 7,064,665 B2 | 6/2006 | Woodall et al. |
| 7,085,791 B2 | 8/2006 | Barry et al. |
| 7,118,033 B2 | 10/2006 | Merkert |
| 7,120,696 B1 | 10/2006 | Au et al. |
| 7,170,997 B2 | 1/2007 | Petersen et al. |
| 7,190,787 B1 | 3/2007 | Graunke et al. |
| 7,197,279 B2 | 3/2007 | Bellantoni |
| 7,212,632 B2 | 5/2007 | Scheidt et al. |
| 7,219,113 B2 | 5/2007 | Bonaccio et al. |
| 7,268,681 B2 | 9/2007 | Fitzgibbon |
| 7,269,416 B2 | 9/2007 | Guthrie et al. |
| 7,277,543 B1 | 10/2007 | Driscoll |
| 7,293,698 B2 | 11/2007 | Cheng et al. |
| 7,375,616 B2 | 5/2008 | Rowse et al. |
| 7,378,967 B2 | 5/2008 | Sullivan et al. |
| 7,407,110 B2 | 8/2008 | Davis et al. |
| 7,412,056 B2 | 8/2008 | Farris et al. |
| 7,492,898 B2 | 2/2009 | Farris et al. |
| 7,492,905 B2 | 2/2009 | Fitzgibbon |
| 7,551,081 B2 | 6/2009 | Vrba et al. |

(56) References Cited

U.S. PATENT DOCUMENTS

| | | |
|---|---|---|
| 7,771,334 B2 | 8/2010 | Bailey et al. |
| 8,138,923 B2 | 3/2012 | Grunwald et al. |
| 8,183,980 B2 | 5/2012 | Davis et al. |
| 8,312,540 B1 | 11/2012 | Kahn et al. |
| 8,358,783 B2 | 1/2013 | Davis et al. |
| 8,411,764 B2 * | 4/2013 | Nelson ............... G06K 7/10297 340/10.5 |
| 8,923,513 B2 | 12/2014 | Guthery et al. |
| 8,943,562 B2 | 1/2015 | Guthery et al. |
| 2001/0041593 A1 | 11/2001 | Asada |
| 2001/0056534 A1 | 12/2001 | Roberts |
| 2002/0016913 A1 | 2/2002 | Wheeler et al. |
| 2002/0036569 A1 | 3/2002 | Martin |
| 2002/0078381 A1 | 6/2002 | Farley et al. |
| 2002/0131595 A1 | 9/2002 | Ueda et al. |
| 2002/0184539 A1 | 12/2002 | Fukuda et al. |
| 2003/0007473 A1 | 1/2003 | Strong et al. |
| 2003/0014646 A1 | 1/2003 | Buddhikot et al. |
| 2003/0055667 A1 | 3/2003 | Sgambaro et al. |
| 2003/0074319 A1 | 4/2003 | Jaquette |
| 2003/0081785 A1 | 5/2003 | Boneh et al. |
| 2003/0204541 A1 | 10/2003 | Shackleford et al. |
| 2003/0208697 A1 | 11/2003 | Gardner |
| 2004/0069852 A1 | 4/2004 | Seppinen et al. |
| 2004/0087273 A1 | 5/2004 | Perttila et al. |
| 2004/0089707 A1 | 5/2004 | Cortina et al. |
| 2004/0153291 A1 | 8/2004 | Kocarev et al. |
| 2004/0162863 A1 | 8/2004 | Barry et al. |
| 2004/0162864 A1 | 8/2004 | Nowshadi et al. |
| 2004/0176032 A1 | 9/2004 | Kotola et al. |
| 2004/0179684 A1 | 9/2004 | Appenzeller et al. |
| 2004/0212493 A1 | 10/2004 | Stilp |
| 2004/0232220 A1 | 11/2004 | Beenau et al. |
| 2005/0002533 A1 | 1/2005 | Langin-Hooper et al. |
| 2005/0010624 A1 | 1/2005 | Stehle |
| 2005/0010750 A1 | 1/2005 | Ward et al. |
| 2005/0036620 A1 | 2/2005 | Casden et al. |
| 2005/0044119 A1 | 2/2005 | Langin-Hooper et al. |
| 2005/0063004 A1 | 3/2005 | Silverbrook et al. |
| 2005/0110210 A1 | 5/2005 | Soltys et al. |
| 2005/0116813 A1 | 6/2005 | Raskar |
| 2005/0127172 A1 | 6/2005 | Merkert, Sr. |
| 2005/0129247 A1 | 6/2005 | Gammel et al. |
| 2005/0166040 A1 | 7/2005 | Walmsley |
| 2005/0182946 A1 | 8/2005 | Shatford |
| 2005/0216955 A1 | 9/2005 | Wilkins et al. |
| 2005/0265546 A1 | 12/2005 | Suzuki |
| 2006/0083228 A1 | 4/2006 | Ong et al. |
| 2006/0101274 A1 * | 5/2006 | Merkert, Sr. ............ H04L 63/08 713/182 |
| 2006/0123466 A1 | 6/2006 | Davis et al. |
| 2006/0156027 A1 | 7/2006 | Blake |
| 2006/0174184 A1 | 8/2006 | Stroud et al. |
| 2006/0177056 A1 | 8/2006 | Rostin et al. |
| 2006/0179094 A1 | 8/2006 | Onaya et al. |
| 2006/0181397 A1 | 8/2006 | Limbachiya |
| 2006/0206554 A1 | 9/2006 | Lauter et al. |
| 2006/0210081 A1 | 9/2006 | Zhu et al. |
| 2006/0224901 A1 | 10/2006 | Lowe |
| 2006/0255129 A1 | 11/2006 | Griffiths |
| 2006/0267733 A1 * | 11/2006 | Steinke ............... G06K 7/0004 340/10.1 |
| 2006/0288101 A1 | 12/2006 | Mastrodonato et al. |
| 2006/0294312 A1 | 12/2006 | Walmsley |
| 2007/0016942 A1 | 1/2007 | Sakai et al. |
| 2007/0034691 A1 | 2/2007 | Davis et al. |
| 2007/0043954 A1 | 2/2007 | Fox |
| 2007/0057057 A1 | 3/2007 | Andresky et al. |
| 2007/0076864 A1 | 4/2007 | Hwang |
| 2007/0099597 A1 | 5/2007 | Arkko et al. |
| 2007/0109101 A1 | 5/2007 | Colby |
| 2007/0121943 A1 | 5/2007 | Dellow et al. |
| 2007/0165847 A1 | 7/2007 | Langin-Hooper et al. |
| 2007/0165848 A1 | 7/2007 | Reyes |
| 2007/0178886 A1 | 8/2007 | Wang et al. |
| 2007/0183593 A1 | 8/2007 | Yoshida et al. |
| 2007/0195952 A1 | 8/2007 | Singanamala |
| 2007/0214293 A1 | 9/2007 | Gangstoe et al. |
| 2007/0236336 A1 * | 10/2007 | Borcherding ........ G06K 7/0008 340/10.34 |
| 2007/0269048 A1 | 11/2007 | Hsu |
| 2007/0273497 A1 | 11/2007 | Kuroda et al. |
| 2007/0293192 A9 | 12/2007 | De Groot |
| 2007/0294528 A1 | 12/2007 | Shoji et al. |
| 2007/0294531 A1 | 12/2007 | Alten |
| 2007/0294539 A1 | 12/2007 | Shulman et al. |
| 2007/0296817 A1 | 12/2007 | Ebrahimi et al. |
| 2008/0001778 A1 | 1/2008 | Challener et al. |
| 2008/0005532 A1 | 1/2008 | Liao et al. |
| 2008/0010218 A1 | 1/2008 | Zank |
| 2008/0012690 A1 | 1/2008 | Friedrich |
| 2008/0014867 A1 | 1/2008 | Finn |
| 2008/0016363 A1 | 1/2008 | Lapstun et al. |
| 2008/0032626 A1 | 2/2008 | Chen |
| 2008/0037466 A1 | 2/2008 | Ngo et al. |
| 2008/0046493 A1 | 2/2008 | Rosenberg |
| 2008/0061941 A1 | 3/2008 | Fischer et al. |
| 2008/0072283 A1 | 3/2008 | Relyea et al. |
| 2008/0094171 A1 | 4/2008 | Sawhney |
| 2008/0184349 A1 | 7/2008 | Ting |
| 2008/0229400 A1 | 9/2008 | Burke |
| 2009/0066509 A1 | 3/2009 | Jernstrom et al. |
| 2009/0128392 A1 | 5/2009 | Hardacker et al. |
| 2009/0153290 A1 | 6/2009 | Bierach |
| 2009/0315673 A1 | 12/2009 | Huang |
| 2010/0001840 A1 | 1/2010 | Kang et al. |
| 2010/0034375 A1 * | 2/2010 | Davis ................... G06F 21/606 380/42 |
| 2010/0039220 A1 | 2/2010 | Davis |
| 2012/0082963 A1 * | 4/2012 | Pirch ................... H01Q 1/2216 434/118 |
| 2017/0178433 A1 * | 6/2017 | Selinder ............. G07C 9/00111 |

FOREIGN PATENT DOCUMENTS

| | | |
|---|---|---|
| EP | 0616429 | 9/1994 |
| EP | 0697491 | 2/1996 |
| EP | 0843438 | 5/1998 |
| EP | 0872976 | 10/1998 |
| EP | 0924894 | 6/1999 |
| EP | 0949563 | 10/1999 |
| EP | 0956818 | 11/1999 |
| EP | 0996928 | 5/2000 |
| EP | 1148644 | 10/2001 |
| EP | 1209551 | 5/2002 |
| EP | 1251448 | 10/2002 |
| EP | 1292882 | 3/2003 |
| EP | 1398691 | 3/2004 |
| EP | 1418484 | 5/2004 |
| EP | 1420542 | 5/2004 |
| EP | 1460573 | 9/2004 |
| EP | 1643643 | 4/2006 |
| EP | 1696360 | 8/2006 |
| EP | 1043687 | 11/2006 |
| EP | 1760985 | 3/2007 |
| EP | 2157526 | 2/2010 |
| GB | 2256170 | 12/1992 |
| GB | 2331825 | 6/1999 |
| JP | 2002-261749 | 9/2002 |
| KR | 2002-0073716 | 9/2002 |
| RU | 2158444 | 10/2000 |
| RU | 2195020 | 12/2002 |
| WO | WO 97/17683 | 5/1997 |
| WO | WO 99/56429 | 11/1999 |
| WO | WO 01/013218 | 2/2001 |
| WO | WO 01/18331 | 3/2001 |
| WO | WO 02/082367 | 10/2002 |
| WO | WO 03/027832 | 4/2003 |
| WO | WO 03/042812 | 5/2003 |
| WO | WO 2004/010373 | 1/2004 |
| WO | WO 2004/039119 | 5/2004 |
| WO | WO 2006/015625 | 8/2004 |
| WO | WO 05/001777 | 1/2005 |
| WO | WO 2005/018137 | 2/2005 |

(56) References Cited

FOREIGN PATENT DOCUMENTS

| WO | WO 2005/029315 | 3/2005 |
|---|---|---|
| WO | WO 2005/038633 | 4/2005 |
| WO | WO 2005/038729 | 4/2005 |
| WO | WO 2006/032941 | 3/2006 |
| WO | WO 2006/036521 | 4/2006 |
| WO | WO 2006/123316 | 11/2006 |
| WO | WO 2006/126668 | 11/2006 |
| WO | WO 2007/094868 | 8/2007 |
| WO | WO 2007/103906 | 9/2007 |
| WO | WO 2007/117315 | 10/2007 |
| WO | WO 2007/120215 | 10/2007 |
| WO | WO 2008/001918 | 1/2008 |
| WO | WO 2008/010441 | 1/2008 |
| WO | WO 2008/043125 | 4/2008 |

OTHER PUBLICATIONS

"Condoplex—The World Leader in Developing Security and Communication Solutions," retrieved from http://web.archive.org/web/20040324112641/http:llcondoplexinc.com/, publication date Mar. 24, 2004, 1 page.

"Contactless Technology for Secure Physical Access: Technology and Standards Choices," Smart Card Alliance White Paper, Oct. 2002, 36 pages.

Data Sheet, "26 Bit Weigand Specifications," Essex Electronics Incorporated, Apr. 1, 1998, 1 page.

Data Sheet, "Micro RWD EM4001 'Mag swipe' Decimal Output Version," IB Technology, May 3, 2005, pp. 1-8.

"Information Technology: Application Profile for Commercial Biometrical Physical Access Control," Project INCITS 1706-D, 2005, 16 pages.

"Open Supervised Device Protocol (OSDP)," Security Industry Association, © 2014, Version 2.1.6, 61 pages.

Press Release, "Radio Frequency Identification (RFID) based immobilizer systems help to curb auto theft and reduce insurance costs," Texas Instruments, May 7, 1999, 2 pages.

"Technology Basics: Understanding Wiegand," HID Corporation, 2004, 5 pages.

"TS0870 Series Smart Card Readers," Interlogix, © 2013, 2 pages.

Anashin, V. "Uniformly distributed sequences over p-adic integers," Number Theoretic and Algebraic Methods in Computer Science, Moscow 1993 (A.J. van der Poorten, I.Shparlinski, and H.G. Zimmer eds., 1995), pp. 1-18, available at http://crypto.rsuh.ru/papers/anashin-paper1.pdf.

Anashin, V., "Pseudorandom number generation by p-adic ergodic transformations" (Jan. 29, 2004), available at http://arxiv.org/abs/cs.CR/0401030.

Anashin, V., "Pseudorandom number generation by p-adic ergodic transformations: An addendum" (Feb. 26, 2004), pp. 1-9, available at http://arxiv.org/abs/cs.CR/0402060.

Anashin "Non-Archimedean Ergodoci Theory and Pseudorandom Generators," Oct. 7, 2007, 39 pages, available at http://arxiv.org/abs/0710.1418v1.

Anashin, V., "Uniformly distributed sequences in computer algebra, or how to constuct program generators of random numbers," J. Math. Sci., 89(4):1355-1390 (1998), available at http://crypto.rsuh.ru/papers/anashin-paper5.pdf.

Anashin, V., "Uniformly distributed sequences of p-adic integers," II. Discrete Math. Appl., 12(6):527-590 (2002), available at http://arXiv.org/abs/math.NT/0209407.

Anashin, V., "Uniformly distributed sequences of p-adic integers," Mathematical Notes, 55(2):109-133 (1994), available at http://crypto.rsuh.ru/papers/anashin-paper2.pdf.

Barker, Cryptanalysis of Shift-Register Generated Stream Cipher Systems, Cryptographic Series No. 39, Aegean Park Press, 1984, Chapters 1-3, pp. 1-38.

Blum, M. et al., "How to Generate Cryptographically Strong Sequences of Pseudo-Random Bits," SIAM Journal on Computing, Nov. 1984, vol. 13, No. 4, pp. 850-864.

Brian, M., "How Remote Entry Works," Howstuffworks.com, retrieved from http://auto.howstuffworks.com/remote-entry.htm, printed on May 19, 2005, copyright 2005, 8 pages.

Damgard, I., "On the Randomness of Legendre and Jacobi Sequences," Advances in Cryptology (Proceedings of Crypto '88), Lecture Notes in Computer Science (1990), pp. 163-172.

Davis, M., "Reader to Panel Authentication," Cartes 2005, Paris, France, Nov. 1, 2005, 33 pages.

Glass, B., "DMCA Used in Garage Door Battle," Ziff Davis Media, retrieved from http://www.extremetech.com/print_article2/0,2533 on May 19, 2005 (Jan. 23, 2003), 1 page.

Knebelkamp et al., "Latest Generation Technology for Immobilizer Systems," Texas Instruments, retrieved from www.ti.com/tiris on May 19, 2005, 11 pages.

Koblitz, N., p-Adic Number, p-Adic Analysis and Zeta Functions, Chapter 3, Building up Ω, Springer, New York, (1977), pp. 52-74.

Kuipers, et al., Uniform Distribution of Sequences, John Wiley & Sons (1974), 400 pages (Submitted in 3 Parts).

Levin, L., "One Way Functions and Pseudorandom Generators," Combinatorica, vol. 7(4) (1987), pp. 357-363.

Luby, M., Pseudorandomness and Cryptographic Applications, Princeton University Press (1996), pp. ix-55.

Weinstein, L., "DMCA: Ma Bell Would Be Proud," Wired News, Jan. 20, 2003, 27 pages.

Woodcock, F., et al., "p-Adic Chaos and Random Number Generation," Experimental Mathematics, vol. 7(4), (1998), pp. 334-342.

* cited by examiner

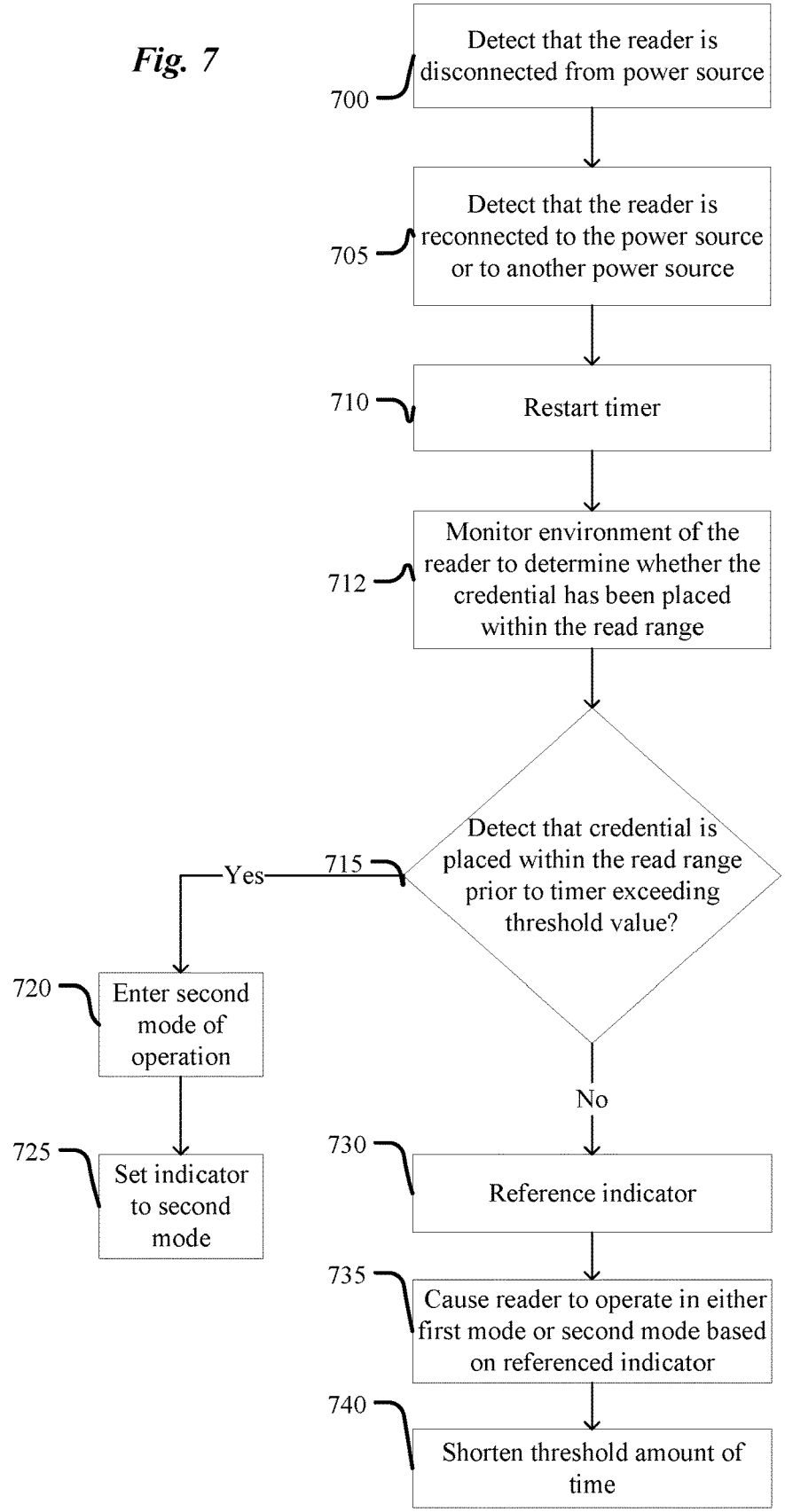

METHODS TO COMBINE AND AUTO-CONFIGURE WIEGAND AND RS485

CROSS-REFERENCE TO RELATED APPLICATIONS

This application claims the benefit of U.S. Provisional Patent Application No. 62/435,506, filed on Dec. 16, 2016, which application is hereby incorporated herein by reference in its entirety.

FIELD OF THE DISCLOSURE

The present disclosure is generally directed toward a physical access control system and methods of operating the same.

BACKGROUND

Radio Frequency Identification (RFID) technology is used in a variety of applications including physical access control systems (e.g., contactless physical access control systems). Such physical access control systems usually include RFID readers that wirelessly communicate with RFID tags (or credentials) according to a communications protocol to allow or to deny access to a secured area such as a building, a room, etc. In some cases the reader is connected to a control panel that assists the reader in making access control decisions.

BRIEF DESCRIPTION OF THE DRAWINGS

The present disclosure is described in conjunction with the appended figures, which are not necessarily drawn to scale:

FIG. 7 illustrates other example operations of the reader of FIGS. 1 and 2 according to at least one example embodiment.

DETAILED DESCRIPTION

Figure 1:
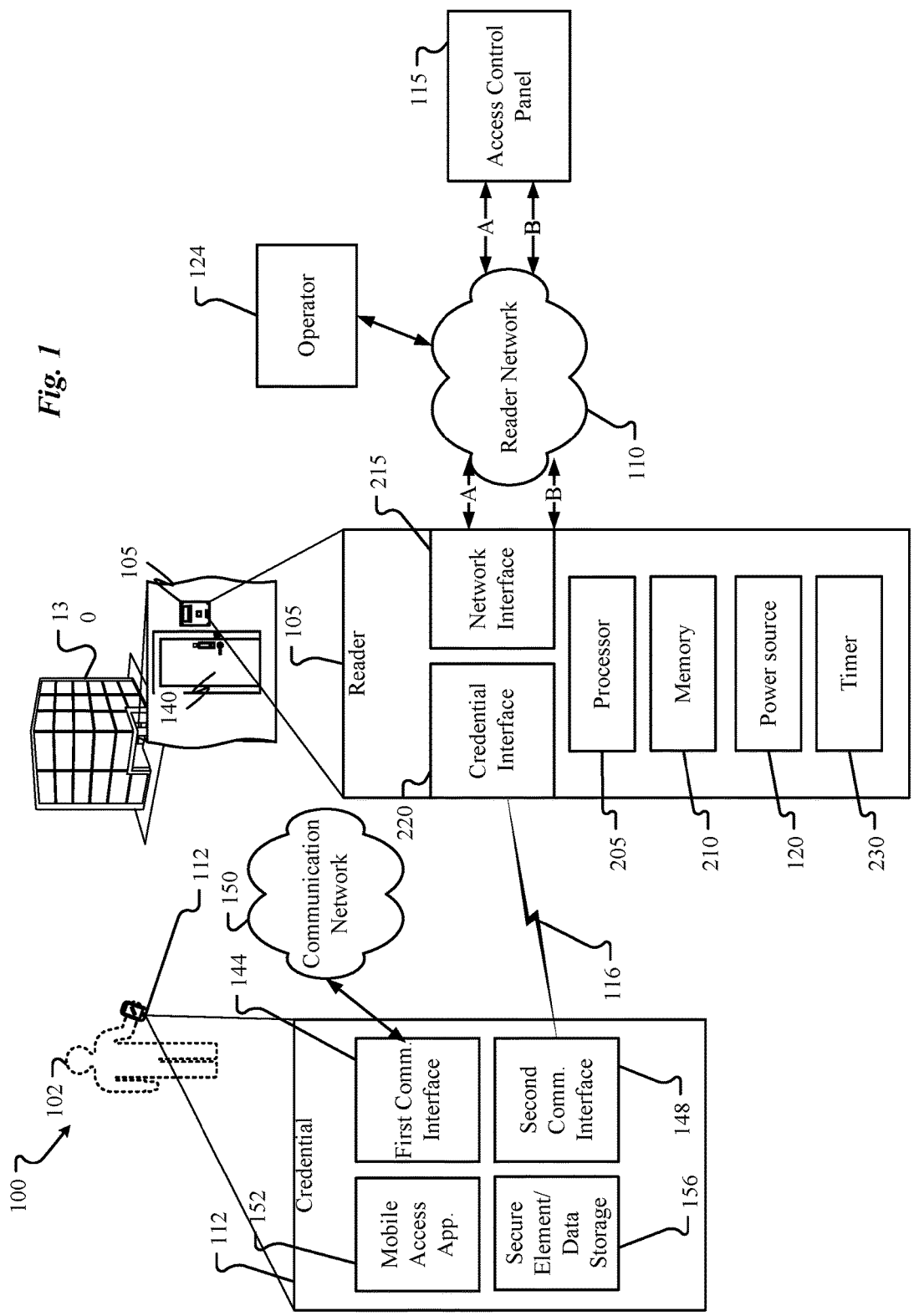
FIG. 1 illustrates an example access control system according to at least one example embodiment.

Two illustrative protocols used for RFID physical access control systems include Open Supervised Device Protocol (OSDP) and the Wiegand protocol. The Wiegand communications interface is a predominant standard in connecting access control readers with access control panels but OSDP is gaining market share; often panels support both. The Wiegand protocol uses an open collector signaling wiring standard [SIA AC-01-1996.10] whereas OSDP uses twisted-pair balanced line RS485 wiring standard [TIA/EIA-485]. The type of communications protocol and wiring standard of an RFID system is often chosen at the time of installing the system depending on the system requirements and which is supported by the access control panel. In such cases, it may be desirable for the reader to automatically detect what type of protocol is being implemented within the physical access control system and to inform the associated access control panel of the type of protocol being used. However, the operating voltages of the circuitry associated with each wiring standard are incompatible. Typically, Wiegand is 0V or 5V whereas RS485 is +/−6V unloaded (and can be as low as +/−1.5V when loaded). Therefore, to physically combine the two, an analog multiplexer (MUX) may be used. This introduces costs and a control line for path control. The MUX may have supply voltages of +6V and −6V to support +/−6V input/outputs. To achieve the negative supply voltage, a charge pump may be included in the circuitry.

One way to determine a protocol of the reader is to auto-sense whether it's externally connected to a Wiegand interface or an RS485 interface. This is accomplished by including a voltage comparator on the Wiegand/RS485 lines and looking for a negative voltage. If negative, then the reader can determine that it is connected to a RS485 interface. If not negative, then the reader can determine that it is connected to a Wiegand interface. Advantages of this approach are that configuration is simplified and is less prone to errors. However, there are technical challenges. For example, in order for the RS485 line to go negative, a message needs to be sent from the connecting device (e.g., control panel, or laptop trying to connect to the reader). If a 0V/5V FTDI USB cable (An FTDI cable is a USB to Serial (TTL level) converter which allows for a simple way to connect TTL interface devices to USB. The I/O pins of this FTDI cable are configured to operate at 5V) is used for the RS485 interface, it may be difficult to distinguish these levels from a Wiegand interface, since the levels are the same. One way around this is to prohibit these 0V/5V FTDI USB-to-RS485 cables, and only use the industrial FTDI USB cables which generate proper positive/negative RS485 voltage levels instead.

In lieu of enabling a reader to auto-sense the type of network to which it is connecting, another option is to enable manual configuration via dipswitches, Bluetooth, or a configuration card.

Yet another option is auto-configuration, in which the reader enters the correct configuration based upon a predetermined flow of states, or an external event (such as presentation of either a credential or RS485 message).

In accordance with some embodiments of the present disclosure, a reader is provided with a Default Mode, which sets the path for RS485 (or OSDP mode). The reader is configured to remain in its Default Mode until it receives one of two possible events, an RS485 Message or Credential Presentation. If the reader receives an OSDP (or other) message over RS485, then the reader knows it has an RS485 connection. In this scenario, the connection path remains the same as in the Default Mode, but the reader is now officially in an OSDP Mode of operation. It should be noted that the initial RS485 message must precede a credential presentation. However, if at any point, a credential is presented to the reader before an RS485 message is received, then the reader assumes it is connected to a Wiegand interface (since it never received an RS485 message) and, in response to detecting such an event, the reader switches to a Wiegand Mode of operation.

To summarize, at any given moment, the reader is in one of three possible serial communication modes, Default Mode (path=RS485), OSDP Mode (path=RS485), and Wiegand Mode (path=Wiegand). Once a reader establishes its mode of operation, then the reader saves and retains that configuration in its local memory (e.g., a non-volatile memory co-located in a housing of the reader). Accordingly, if a reader experiences a reset, then the reader can be configured to return to its previous configuration upon reboot. This addresses the case of a power outage in a building.

Several scenarios exist that can complicate the straight-forward concept described above. To handle these scenarios, after a reset, the reader can be configured to boot-up with the RS485 path enabled for a predetermined amount of time (e.g., a predetermined number of seconds). Scenarios that can be solved by utilizing auto-configuration include the scenario in which a new reader from the factory is mounted to a wall for the first time, a scenario in which the reader is reset on the wall, a scenario in which a factory configuration of the reader is adjusted in the field, a scenario in which the reader is re-purposed in the field from Wiegand to OSDP, a scenario in which the reader is re-purposed in the field from OSDP to Wiegand, a power-fail/recovery cycle, a tamper condition, and a scenario in which a reader is mounted but the control panel is not yet connected.

Embodiments of the present disclosure propose the following reader behavior to address the above-identified scenarios and other related scenarios. In some embodiments, the default factory configuration for the reader is set to be a Default Mode (path=RS485). If a credential (e.g., any compatible card, smartphone, etc. and not necessarily an authorized one) is presented to the reader before an OSDP message is received, the reader will switch to Wiegand Mode (path=Wiegand) and save the new configuration. If an OSDP message is received at the reader before a credential is presented to the reader, the reader will switch to OSDP Mode (path=RS485) and save that configuration. Once configured for OSDP or Wiegand, the reader retains configuration after reset by virtue of storing its configuration information in non-volatile memory. After the reader is reset, the reader will remain in Default Mode (path=RS-485) for a predetermined amount of time (this amount of time may be configuration and may further be different between Wiegand and OSDP configurations). As a non-limiting example, after reset the reader will remain in the Default Mode for the predetermined amount of time. After the predetermined amount of time has expired, and no OSDP message has come from the control panel, the reader restores previously saved configuration (e.g., the reader either enters the Wiegand Mode of operation or the OSDP mode of operation and does not remain in the Default Mode of operation beyond the predetermined amount of time after the reset). If the reader reverts back to the Wiegand Mode of operation, the reader will send an "I'm Alive" signal to the control panel. If tampered with, the reader will send an "Invert I'm Alive" signal to the control panel. If an OSDP message is received at the reader prior to the predetermined amount of time expiring, then the reader enters the OSDP Mode of operation. If a credential is presented to the reader prior to the predetermined amount of time expiring without receiving an OSDP message, the reader enters the Wiegand Mode of operation.

The above behavior has the following advantages: (i) simple for the reader manufacturer to implement because the reader is by default listening for RS485 messages; (ii) simple reader installation—if a fresh mount is Wiegand, present any card to switch the reader to Wiegand mode, if it is OSDP, do not do anything; (iii) simple to reconfigure the reader from OSDP to Wiegand by simply presenting any credential to the reader after reset within the predetermined amount of time after the reader is reset; and (iv) simple to reconfigure the reader from Wiegand to OSDP because the control panel simply sends an OSDP message to the reader within the predetermined amount of time after the reader is reset.

Various aspects of the example embodiments will be described herein with reference to drawings that are schematic illustrations of idealized configurations. It should be appreciated that while particular circuit configurations and circuit elements are described herein, example embodiments are not limited to the illustrative circuit configurations and/or circuit elements depicted and described herein. Specifically, it should be appreciated that circuit elements of a particular type or function may be replaced with one or multiple other circuit elements to achieve a similar function without departing from the scope of example embodiments.

It should also be appreciated that example embodiments described herein may be implemented in any number of form factors. Specifically, the entirety of the blocks or circuits disclosed herein may be implemented in silicon as a fully-integrated solution (e.g., as a single Integrated Circuit (IC) chip or multiple IC chips) or they may be implemented as discrete components connected to a Printed Circuit Board (PCB).

FIG. 1 illustrates an access control system 100 according to at least one example embodiment. The access control system 100 may be for providing access to a building 130 through a security door 140 for a user 102 (or installer of the access control system 100). The system 100 includes a reader network 110, an access control reader (or reader) 105, a credential (or mobile device) 112, an access control panel (or control panel) 115, an operator 124, and a communication network 150. It should be appreciated that the operator 124 and access control panel 115 may be provided as a common component, although such a configuration is not required. In some embodiments, the operator 124 and/or access control panel 115 are owned and/or operated by a hospitality management entity. In particular, the operator 124 may generate keys for use in a multi-room facility 130 (e.g., hotel, cruise ship, dorm, motel, etc.) and the access control panel 115 may be used to distribute the keys generated by the operator 124 to various credentials or mobile devices 112 (e.g., purpose-built cards and/or key fobs). The control panel 115 may assist the access control reader 105 in making access control decisions with respect to credentials 112 presented to the credential interface 220 of the access control reader 105. The access control panel 115 is described in more detail below with reference to FIG. 3.

The reader network 110 may be a Physical Access Control System (PACS) network to facilitate communication between the network interface 215 and the access control panel 115. For example, the reader network 110 may adhere to RS485 wiring standards to communicate using OSDP and/or adhere to Wiegand wiring standards to communicate using Wiegand protocol. It should be understood that example embodiments are not limited to the reader network 110 operating according to the two wiring standards and protocols (and the reader 105 that auto-configures itself accordingly) described above. For example, the reader network 110 may support three or more protocols in which case the reader 105 may auto-configure itself to operate according to any one of the three or more protocols depending upon events.

The credential 112 may correspond to one or multiple devices that are carried by a user and/or guest of the multi-room facility being managed by the operator 124. The credential 112 may correspond to a movable device capable of being operated by a user or multiple users. When fully functional, the credential 112 may be capable of communicating with the access control panel 115 via the communication network 110 using any of the protocols supported by the communication network 110. In some embodiments, a first communication interface 144 of the credential 112 may be used to connect the credential 112 directly to the communication network 110, thereby enabling an exchange of keys between the access control panel 115 and credential 112.

However, there may be instances where the first communication interface 144 is disabled or otherwise prohibited from connecting to the communication network 110. For instance, when the credential 112 is administered by its user to avoid roaming (e.g., if the credential 112 is a mobile phone having cellular service disabled due to international travel), the first communication interface 144 may be limited or completely disabled to avoid roaming and any charges incurred in connection therewith. In such a scenario, the mobile communication device 112 may rely upon a second communication interface 148 to facilitate communications with nearby devices via a proximity-based communication channel 116. Illustrative credentials 112 include, without limitation, smartphones, contactless cards, magstripe cards, Wi-Fi-enabled devices, key fobs, Personal Digital Assistants (PDAs), wearable devices (e.g., smart watches, smart clothes), etc.

In some embodiments, the communication channel 116 may correspond to a Bluetooth low energy (BLE) communication channel. In some embodiments, the communication channel 116 may correspond to a near field communication (NFC) channel. In some embodiments, the communication channel 116 may correspond to an Infrared communication channel. In some embodiments, the communication channel 116 may correspond to an Ultrasonic communication channel. Any other type of communication protocol that is dependent upon proximity and/or line-of-sight may be utilized between the credential 112 and reader 105. Other protocols may also be used to exchange information between the credential 112 and the reader 105. For instance, the reader 105 may include a barcode or Quick Response (QR) code dynamically displayed on a screen thereof, or affixed by a sticker or the like to a surface of the reader 105. The credential 112 may obtain information from the reader 105 by taking one or more images of the reader's 105 screen or sticker and decoding the barcode and/or QR code. Another type of communication channel 116 that may be used without departing from the scope of the present disclosure is a peer-to-peer Wi-Fi connection. When possible (e.g., when BLE or NFC is used as the channel 116), no manual pairing process is needed, thereby making it possible to simply tap the reader 105 with the credential 112 to establish the communication channel 116. It should be appreciated, however, that access to the communication channel 116 (and more specifically the device interface 220 of the reader 105) may be restricted to credentials 112 having a valid mobile access application 152 stored thereon. A credential 112 without the mobile access application 152 may not be allowed to establish a communication channel 116 with the device interface 220. Thus, the mobile access application 152 may be used to perform an automated mutual authentication with the reader 105 before establishing the communication channel 116 or as part of establishing the communication channel 116.

The credential 112 may include computer memory (e.g., volatile and/or non-volatile) that stores one or more Operating Systems (O/S) and the mobile access application 152, among other items. The credential 112 may also include a processor (e.g., a microprocessor or collection of microprocessors), one or more drivers, a user interface, and a power module. The credential 112 may further include a first communication interface 144 (e.g., a communication network interface) and a second communication interface 148 (e.g., a credential interface) as well as a secure element 156 for storing the one or more access control keys.

The memory of the credential 112 may correspond to any type of non-transitory computer-readable medium. In some embodiments, the memory may include volatile or non-volatile memory and a controller for the same. Non-limiting examples of memory that may be utilized in the credential 112 include RAM, ROM, buffer memory, flash memory, solid-state memory, or variants thereof.

The processor of the credential 112 may correspond to one or many microprocessors that are contained within the housing of the credential 112 with the memory. In some embodiments, the processor incorporates the functions of the credential's 112 Central Processing Unit (CPU) on a single Integrated Circuit (IC) or a few IC chips. As with other processors disclosed herein, the processor may be a multipurpose, programmable device that accepts digital data as input, processes the digital data according to instructions stored in its internal memory, and provides results as output. The processor may implement sequential digital logic as it has internal memory. As with most known microprocessors, the processor may operate on numbers and symbols represented in the binary numeral system.

The communication network 150 may facilitate communication between the first communication interface 144 and the credential interface 220. The communication network 150 may include any type of communication medium or collection of communication equipment that enables remote communication devices to exchange information and/or media with one another using any type of known or yet-to-be developed transport protocol. The communication network 150 may facilitate wired and/or wireless communication technologies. The Internet is an example of a communication network 150 that constitutes an Internet Protocol (IP) network consisting of many computers, computing networks, and other communication devices located all over the world, which are connected through many telephone systems and other means. Other examples of the communication network 150 include, without limitation, a standard Plain Old Telephone System (POTS), an Integrated Services Digital Network (ISDN), the Public Switched Telephone Network (PSTN), a Local Area Network (LAN), a Wide Area Network (WAN), a Session Initiation Protocol (SIP) network, a Voice over IP (VoIP) network, a cellular network (e.g., 3G, 4G, LTE, etc.), and any other type of packet-switched or circuit-switched network known in the art. In addition, it can be appreciated that the communication network 150 need not be limited to any one network type, and instead may include a number of different networks and/or network types. Moreover, the communication network 150 may include a number of different communication media such as coaxial cable, copper cable/wire, fiber-optic cable, antennas for transmitting/receiving wireless messages, and combinations thereof.

The driver(s) of the credential 112 may correspond to hardware, software, and/or controllers that provide specific instructions to hardware components of the credential 112, thereby facilitating their operation. For instance, interfaces 144, 148, may each have a dedicated driver that provides appropriate control signals to effect their operation. The driver(s) may also include the software or logic circuits that ensure the various hardware components are controlled appropriately and in accordance with desired protocols. For instance, the driver of the second communication interface 148 may be adapted to ensure that the second communication interface 148 follows the appropriate proximity-based protocols (e.g., BLE, NFC, Infrared, Ultrasonic, peer-to-peer Wi-Fi, etc.) such that the second communication interface 148 can exchange communications with the reader 105. Likewise, the driver of the first communication interface 144 may be adapted to ensure that the first communication interface 144 follows the appropriate network communication protocols (e.g., TCP/IP (at one or more layers in the OSI model), UDP, RTP, GSM, LTE, Wi-Fi, etc.) such that the interface 144 can exchange communications via the communication network 150. As can be appreciated, the driver(s) may also be configured to control wired hardware components (e.g., a USB driver, an Ethernet driver, etc.).

The second communication interface 148 may correspond to the hardware that facilitates communications via the communication channel 116. The second communication interface 148 may include a Bluetooth interface (e.g., antenna and associated circuitry), a Wi-Fi/802.11N interface (e.g., an antenna and associated circuitry), an NFC interface (e.g., an antenna and associated circuitry), an Infrared interface (e.g., LED, photodiode, and associated circuitry), and/or an Ultrasonic interface (e.g., speaker, microphone, and associated circuitry). In some embodiments, second communication interface 148 is specifically provided to facilitate proximity-based communications with a reader 105 via communication channel 116 or multiple communication channels 116.

The first communication interface 144 may include hardware that facilitates communications with other communication devices over the communication network 150. As mentioned above, the first communication interface 144 may include an Ethernet port, a Wi-Fi card, a Network Interface Card (NIC), a cellular interface (e.g., antenna, filters, and associated circuitry), or the like. The first communication interface 144 may be configured to facilitate a connection between the credential 112 and the communication network 150 and may further be configured to encode and decode communications (e.g., packets) according to a protocol utilized by the communication network 150.

The optional secure element/data storage 156 may correspond to one or multiple secure memory devices that are capable of storing data in an encrypted and secure manner. Communications between the secure element 156 and the interfaces 144, 148 may also be secured, thereby ensuring that data received at the credential 112 is securely stored in the secure element 156 without exposure. The secure element 156 may be integrated into the credential 112 or it may be removable in nature. Suitable examples of secure elements 156 include, without limitation, a Universal Integrated Circuit Card (UICC), an embedded SE, and microSD.

The power module of the credential 112 may include a built-in power supply (e.g., battery) and/or a power converter that facilitates the conversion of externally-supplied AC power into DC power that is used to power the various components of the credential 112. In some embodiments, the power module may also include some implementation of surge protection circuitry to protect the components of the credential 112 from power surges.

The reader 105 may correspond to a purpose-built reader/writer or similar type of device. In some embodiments, the reader 105 includes a device interface or credential interface 220 and a network interface 215. As shown in FIG. 1, the reader 105 may communicate with the access control panel 115 through reader network 110 using either one of paths A and B according to an operational mode of the reader 105 and/or a type of protocol used by the reader network 110 between the reader 105 and access control panel 115. For example, the network interface 215 conducts communication via path A in a first mode of the reader 105 (e.g., using RS485 wiring standards), and the reader 105 conducts communication via path B in a second mode of operation (e.g., using Wiegand wiring standards).

The reader 105 may further include a processor 205, memory 210, a timer, 230 and a power source 120. The processor 205 may be similar or identical to the processor described in connection with the credential 112. For instance, the processor 205 may correspond to a microprocessor or the like. Similarly, the memory 210 may correspond to any type of computer memory such as the memory described with respect to the credential 112. The memory 210 may include computer-executable instructions that, when executed by the processor 205, enable certain functions of the reader 105 to be performed.

The timer 230 may include any necessary hardware and/or software for functions associated with keeping or counting time, such as starting, stopping, and resetting. The memory 210 may store a changeable threshold value or threshold amount of time. The threshold value or threshold amount of time may be a design parameter set based on empirical evidence and/or user defined.

Example operations of the reader 105 are described in more detail below with reference to FIGS. 2-7.

Figure 2:
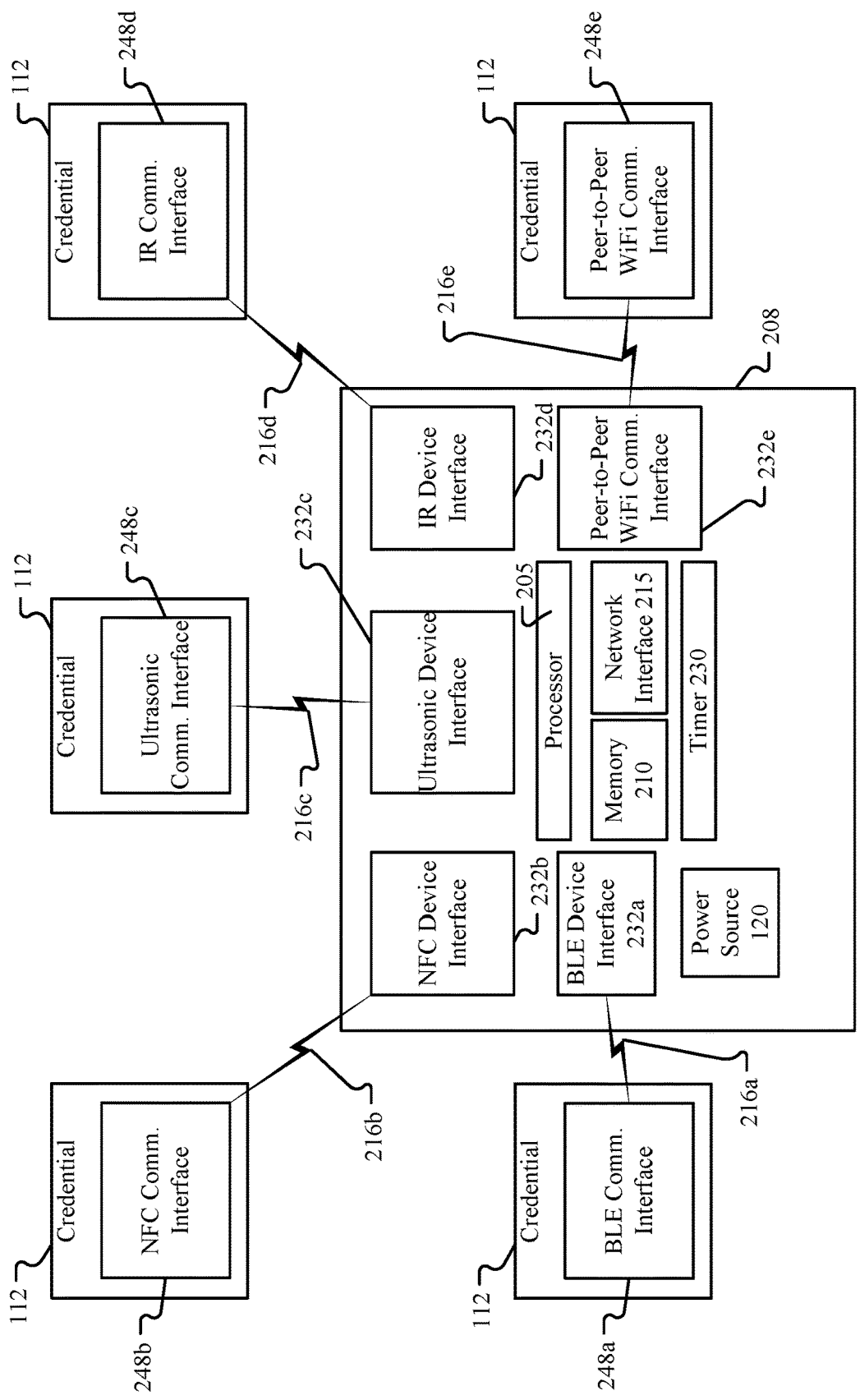
FIG. 2 illustrates an example structure of the access control reader of FIG. 1 according to at least one example embodiment.

A reader 208 according to at least one example embodiment is depicted in FIG. 2. It should be understood that the reader 208 of FIG. 2 illustrates additional details of the reader 105 in FIG. 1. Thus, like the reader 105 in FIG. 1, the reader 208 includes a power source 120, a timer 230, and a memory 210 storing instructions for execution by the processor 205. Such instructions, when executed by the processor, enable the processor to carry out needed functions, including, for example, auto-configuration of the reader's mode of operation.

The access control reader 105 may communicate (e.g., wirelessly communicate) with credential 112 according to a communications protocol to allow or to deny access to a secured area such as a building, a room, etc. The wireless (or contactless) communication may be achieved by antennas built into the reader 105 and the credential 115. The reader 105 and the credential 112 may exchange data signals and/or power signals through respective antennas. The reader 105 may communicate with the access control panel 115 through reader network 110 using one or more communication protocols.

The protocol used by the reader network 110 may be of a particular type. For example, the protocol may be a first type, which allows for the reader 105 to conduct bidirectional (or two way) communications with the control panel 115 over the reader network 110. In this case, the reader 105 may be operating in a first mode corresponding to an OSDP Mode of operation in which the communication protocol for the network 110 is carried out in accordance with OSDP standards and RS485 wiring standards. In another example, the protocol may be a second type, which allows for the reader 105 to conduct unidirectional (or one way) communications with the control panel 115 over the reader network 110. In this case, the reader 105 may be operating in a second mode corresponding to a Wiegand Mode of operation in which the communication protocol for the network 110 is in accordance with Wiegand protocol and wiring standards.

The access control panel 115 assists the reader 105 in making access control decisions with respect to a credential 112. In order for the control panel 115 to do so, the control panel 115 should be informed of which communications protocol is being employed by the reader 105. Accordingly, it is desired for the reader 105 to easily inform the control panel 115 of the communications protocol being employed by the reader 105.

As illustrated in FIG. 1, the access control reader 105 is coupled to the access control panel 115 via the reader network 110. The access control reader 105 comprises circuitry that enables the access control reader 105 to detect (e.g., automatically detect) the type of protocol used by the reader network 110 based on whether or not a credential 112 is presented to the access control reader 105 within a threshold amount of time of the access control reader 105 being installed and then operate in a mode of operation consistent with the detected type of protocol. For example, the access control reader 105 detects the first type of protocol (e.g., OSDP Mode) if the credential is not presented to the access control reader 105 within the threshold amount of time, and operates in a first mode of operation. In another example, the access control reader 105 detects the second type of protocol (e.g., Wiegand Mode) if the credential 112 is presented within the threshold amount of time, and operates in a second mode of operation.

The reader 208 of FIG. 2 also includes one or more device interfaces 232a-e (collectively the credential interface 220 in FIG. 1) for communicating with credentials 112 of different types, for example. To increase the number of credentials 112 with which the reader 208 can communicate, the reader 208 may include, for example, a BLE device interface 232a, an NFC device interface 232b, an ultrasonic device interface 232c, an infrared device interface 232d, and a peer-to-peer Wi-Fi device interface 232e. Thus, as long as a credential 112 has a communication interface 248a-e compatible with at least one of the communication interfaces 232a-e of the reader 208, the credential 112 will be able to communicate with the reader 208. The reader 208 also includes a network interface 215 for communicating with access control panel 115 via the reader network 110.

As depicted in FIG. 2, a credential 112 including a BLE communication interface 248a may establish a BLE communication channel 216a with the BLE device interface 232a of the reader 208. The credential 112 can then transmit a key update request to the reader 105 via the communication channel 216a and receive a key update from the reader 208 via the same communication channel 216a. Likewise, a credential 112 including an NFC communication interface 248b may establish an NFC communication channel 216b with the NFC device interface 232b of the reader 208. A credential 112 including an ultrasonic communication interface 248c may establish an ultrasonic communication channel 216c with the ultrasonic device interface 232c of the reader 208. A credential 112 including an infrared communication interface 248d may establish an infrared communication channel 216d with the infrared device interface 232d of the reader 208. A credential 112 including a peer-to-peer WiFi communication interface 248e may establish a peer-to-peer WiFi communication channel 216e with the peer-to-peer WiFi device interface 232e of the reader 208. In embodiments, the reader 208 is capable of communicating with a plurality of credentials 112 simultaneously (e.g. over multiple device interfaces 232), while in other embodiments the reader 208 is capable of communicating over only one device interface 232 at a given time. In embodiments, the reader 208 is configured to initiate communications with a credential 112 after it is tapped by the credential 112, while in other embodiments the reader 208 is configured to initiate communications with any credential 112 in response to a signal from the credential 112. In still other embodiments, the reader 208 is configured to scan for credentials 112 and to initiate communications (or at least attempt to initiate communications) with any credential 112 within communication range.

Figure 3:
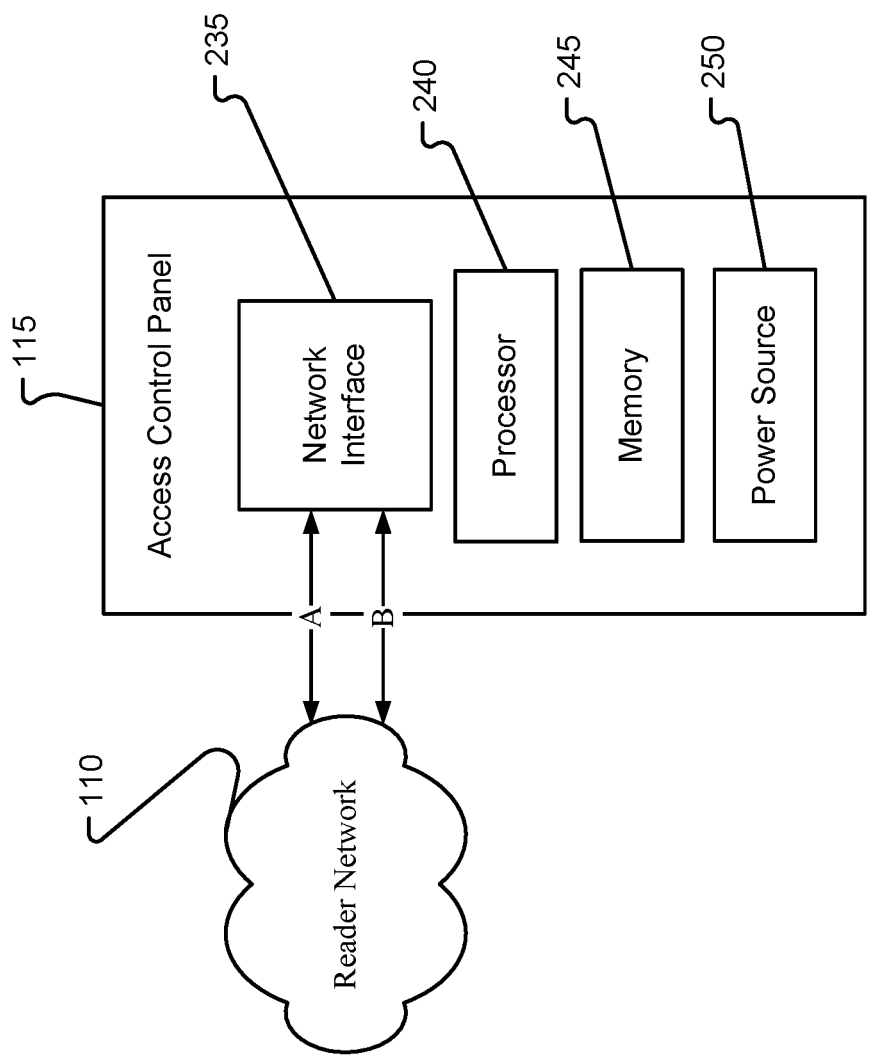
FIG. 3 illustrates an example structure of the access control panel of FIG. 1 according to at least one example embodiment.

FIG. 3 illustrates an example structure of the access control panel 115 of FIG. 1.

According to at least one embodiment, the access control panel 115 includes a network interface 235. The network interface 235 may provide a go-between for the access control panel 115 and the reader network 110.

The access control panel 115 may further include a processor 240, memory 245, and a power source 250. The power source 250 may provide power for the access control panel 115. The processor 240 may be similar or identical to the processor described in connection with the credential 112 and/or the reader 105. For instance, the processor 240 may correspond to a microprocessor or the like. Similarly, the memory 245 may correspond to any type of computer memory. The memory 245 may include computer-executable instructions that, when executed by the processor 240, enable certain functions of the reader access control panel 115 to be performed.

As shown in FIG. 1, the access control panel 115 may conduct communication with reader network 110 either one of paths A and B according to a mode of the reader 105. For example, in a first mode of the reader 105, the network interface 235 conducts communication via path A, and in a second mode of the reader 105 conducts communication via path B. Additional example operations of the access control panel 115 and processor 240 are described in more detail below with reference to FIGS. 4-7.

Figure 4:
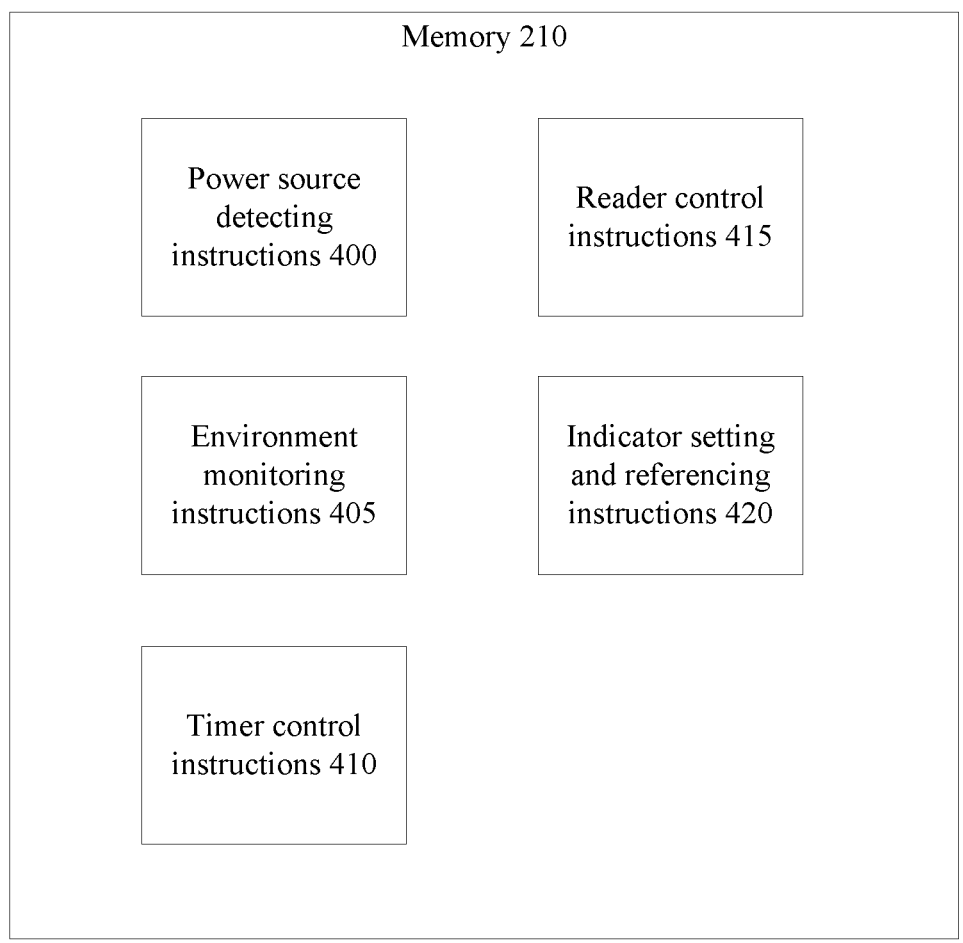
FIG. 4 illustrates example instructions stored on the memory of the access control reader of FIG. 1 according to at least one example embodiment.

FIG. 4 illustrates example instructions stored in the memory 210 of FIGS. 1 and 2. The memory 210 may include power source detecting instructions 400 for causing the processor 205 to detect connections and disconnections of the power source 120 to the reader 105. The memory 210 may include environment monitoring instructions 405 for causing the processor 205 to monitor an environment of the reader 105 (e.g., an environment of the credential interface 220) to determine whether the credential 112 has been placed within a read range of the reader 105. The memory 210 may include timer control instructions 410 that cause the processor 205 to control operation of the timer 230 (e.g., threshold values/amounts of time, start, stop, and reset operations). The memory 210 may include reader control instructions 415 that cause the processor 205 to control the reader 105 to operate in either a first mode or a second mode. The memory 210 may include indicator setting and reference instructions 420 that cause the processor 205 to set and/or reference an indicator that indicates a mode of operation of the reader 105. The effect of instructions 400, 405, 410, 415, and 420 when carried out by the processor 205 are discussed in additional detail below with reference to FIGS. 5A to 7.

Figure 5A:
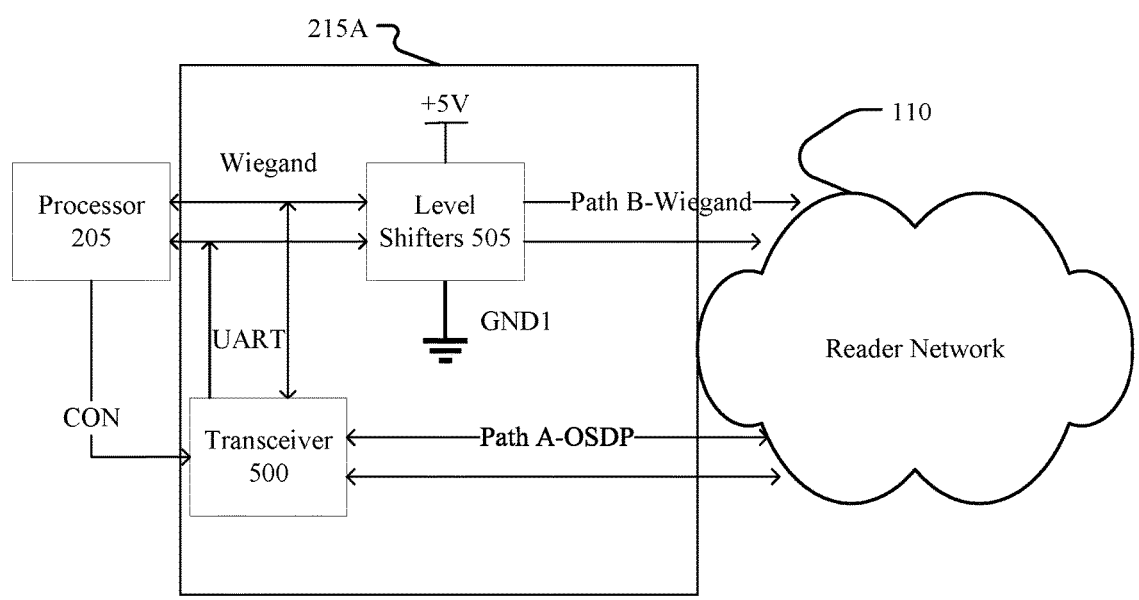
FIG. 5A illustrates an example structure of the network interface of FIGS. 1 and 2 according to at least one example embodiment.

FIG. 5A illustrates an example structure of the network interface of FIGS. 1 and 2 according to at least one example embodiment.

In FIG. 5A, transceiver 500 and level shifters 505 may be included in the network interface 215A of the reader 105. As shown in FIG. 5A, the transceiver 500 and the level shifters 505 are coupled to the processor 205. The transceiver 500 may be controlled by a control signal CON from the processor 205 and may communicate (e.g., exchange access control messages) with the control panel 115 over the reader network 110 through path A of the network interface 215A when the reader 105 is in a first mode of operation. According to at least one example embodiment, the transceiver 500 and path A adheres RS485 standards so that the first mode of operation is an OSDP Mode of operation.

As also shown in FIG. 5A, the processor 205 controls the operation of level shifters 505 to communicate (e.g., exchange access control signals) with the control panel 115 over the reader network 110 through path B of the network interface 215A when the reader 105 is in a second mode of operation. According to at least one example embodiment, the level shifters 505 and path B adhere to Wiegand standards so that the second mode of operation is a Wiegand Mode of operation. As shown in FIG. 5A, the level shifters 505 are powered by a 5V power source and also connected to ground GND1.

Still further shown in FIG. 5A is the ability of the reader 105 to relay Universal Asynchronous Receiver/Transmitter (UART) messages by sharing I/O ports to the processor 205 with level shifters 505. Thus, an example embodiment according to FIG. 5A has three pins or connections for the processor 205 to send/receive signals to/from the transceiver 500 and level shifters 505, and four pins or connections to send/receive signals to/from the reader network 110.

Figure 5B:
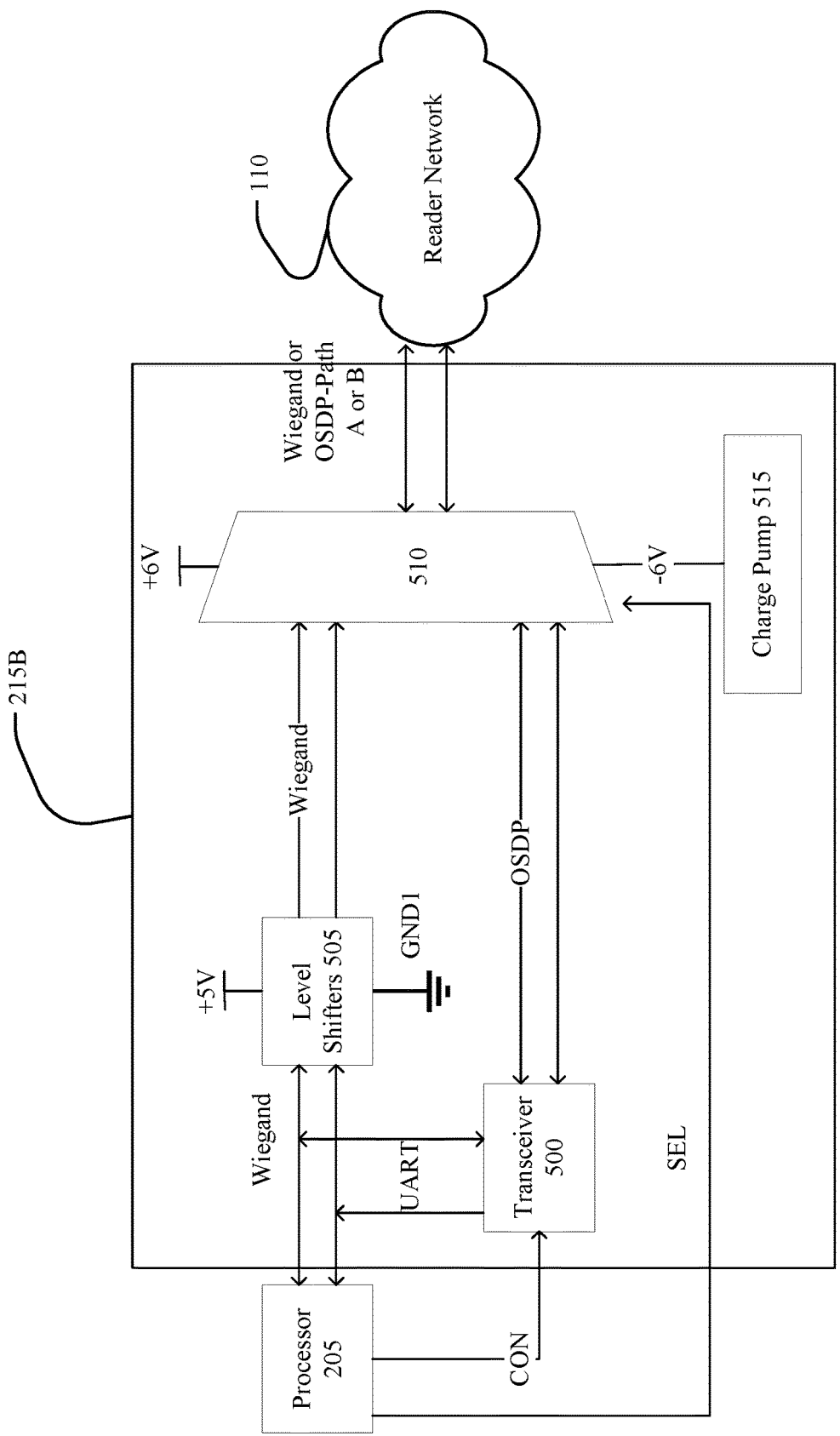
FIG. 5B illustrates another example structure of the network interface of FIGS. 1 and 2 according to at least one example embodiment.

FIG. 5B illustrates another example structure of the network interface of FIGS. 1 and 2 according to at least one other example embodiment. The network interface 215B is similar to network interface 215A from FIG. 5A with the addition of a selector 510, a charge pump 515, and a selection signal SEL. Compared to FIG. 5A, an example embodiment according to FIG. 5B increases the number of pins or connections of the processor 205 to the network interface from three to four and decreases the number of pins or connections of the network interface to the reader network 110 from four to two.

The selector 510 may be, for example, a multiplexer or other circuitry capable of switching between multiple inputs. The selector 510 may have an operating voltage of +/−6V, where the −6V is supplied by charge pump 515. As shown in FIG. 5B, the processor 205 controls an output of the selector 510 according to a selection signal SEL. For example, the processor 205 sends the selection signal SEL to select the output of the selector 510 to be in accordance with a first mode (or OSDP Mode) or a second mode (or Wiegand Mode). Thus, paths A and B use the same two pins or connections between the network interface 215B and reader network 110.

Figure 6:
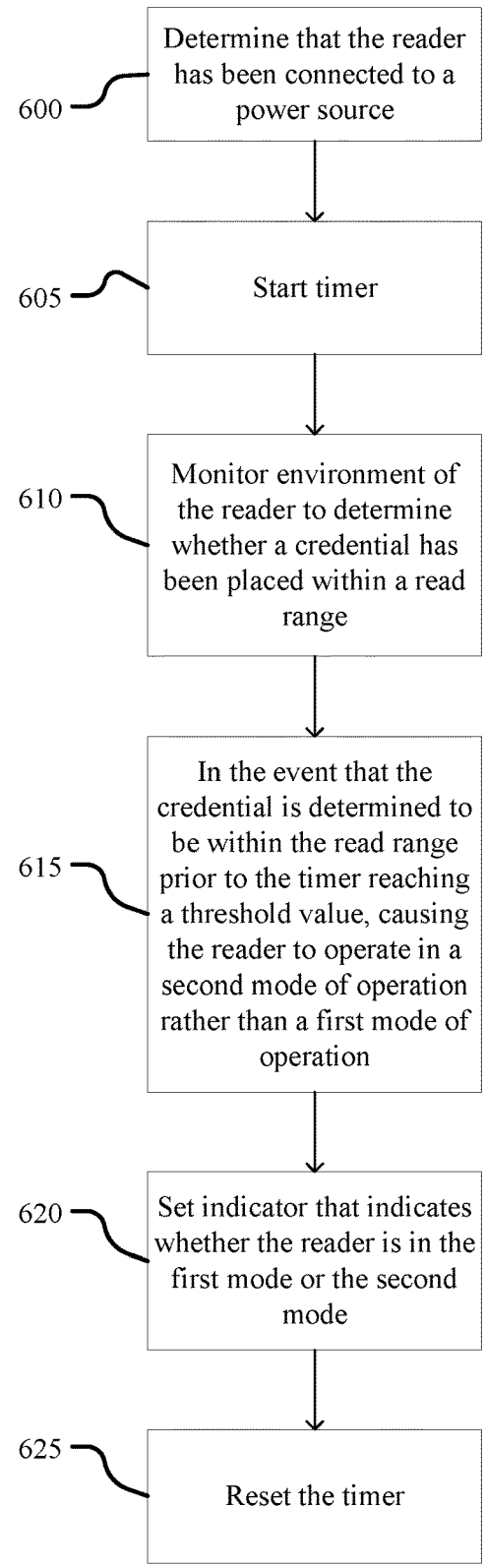
FIG. 6 illustrates example operations of the reader of FIGS. 1 and 2 according to at least one example embodiment.

FIG. 6 illustrates example operations of the processor 205 of FIGS. 1 and 2 according to at least one example embodiment. It should be understood that the operations described with respect to FIG. 6 may be implemented by executing the instructions discussed with reference to FIG. 4.

In operation 600, the processor 205 determines that the access control reader 105 has been connected to the power source 120.

In operation 605, the processor 205 starts the timer 230, which has an initial value (e.g., zero seconds).

In operation 610, the processor 205 monitors an environment of the reader 105 to determine whether a credential 112 has been placed within a read range of the reader 105. That is, the processor 205 monitors activity at the credential interface 220 (e.g., after the access control reader 105 has been connected to the power source 120). The read range corresponds to a distance between the credential 112 and the reader 105 at which the credential 112 and the reader 105 conduct communication through their respective interfaces 144/148 and 220. The read range may be a design parameter set based on empirical evidence and/or may vary according to what type of communication and device interfaces from FIG. 2 are employed.

In operation 615, in the event that the credential 112 is determined to be within the read range of the access control reader 105 prior to the timer reaching a threshold value (or threshold amount of time), the processor 205 causes the access control reader 105 to operate in a second mode of operation rather than a first mode of operation which corresponds to a default mode of operation. That is, the processor 205 causes the reader 105 to enter either a first mode of operation or a second mode of operation dependent upon whether or not activity is detected at the credential interface 220 within a threshold amount of time after the access control reader 105 has been connected to the power source 120, where the activity is the presence of a credential within a read range of the reader 105. For example, the access control reader 105 enters the second mode of operation in response to detecting activity at the credential interface 220 within the threshold amount of time, and the access control reader 105 enters the first mode of operation in response to failing to detect activity at the credential interface 220 within the threshold amount of time. The threshold value or threshold amount of time may be a changeable design parameter based on empirical evidence and/or user defined. For example, the threshold value or threshold amount of time may be on the order of seconds (e.g., 10 seconds).

According to at least one example embodiment, the first mode of operation corresponds to a mode of operation in which the network interface 215 is used to conduct bi-directional communications with at least one other network device (e.g., the control panel 115). For example, the first mode of operation corresponds to an OSDP Mode of operation.

According to at least one example embodiment, the second mode of operation corresponds to a mode of operation in which the network interface 215 is used to conduct unidirectional communications with at least one other network device (e.g., the control panel 115). For example, the second mode of operation corresponds to a Wiegand Mode of operation.

In operation 620, the processor 205 sets an indicator that indicates whether the reader 105 is in the first mode or the second mode. For example, if the reader 105 enters the first mode, then the processor 205 sets the indicator to a value that indicates the first mode, and if the reader 105 enters the second mode, then the processor 205 sets the indicator to a value that indicates the second mode. The indicator may be stored in a nonvolatile memory, such as the memory 210. That is, the processor 205 sets the indicator in the memory 210 to reflect whether the access control reader 105 enters the first mode of operation or the second mode of operation. The indicator may be a binary value(s) stored in a register of the memory 210. For example, a '0' may indicate the first mode and a '1' may indicate the second mode.

In operation 625, the processor 205 resets the timer 230 to the initial value.

It should be appreciated that the operations of FIG. 6 may relate to operations for an initial boot-up of the reader 105 or a first boot-up after a factory restore of the reader 105.

FIG. 7 illustrates example operations of the processor 205 of FIGS. 1 and 2 according to at least one example embodiment. It should be understood that the operations described with respect to FIG. 7 may be implemented by executing the instructions discussed with reference to FIG. 4. It should also be appreciated that FIG. 7 may relate to a situation that occurs for boot-ups of the reader 105 subsequent to the initial boot-up or first boot-up after factory restore (e.g., after accidental power interruption).

In operation 700, the processor 205 detects that the access control reader 105 has been disconnected from the power source 120. The access control reader 105 may become disconnected from the power source 120 as a result of a power outage or other accidental power interruption, or as a result of a purposeful power interruption. The processor 205 may detect the disconnection as a result of detecting that power supply voltage from the power source 120 of the access control reader 105 drops below a threshold voltage value. The threshold voltage value may be a design parameter set based on empirical evidence and/or user defined.

In operation 705, the processor 205 detects that the access control reader 105 is reconnected to the power source 120 or to another power source (not illustrated). For example, the processor 205 detects that the power supply voltage of the access control reader 105 exceeds the threshold voltage value.

In operation 710, the processor 205 restarts the timer 230 in response to detecting the reconnection to a power source in operation 505 (recall that the timer 230 was reset in operation 625 of FIG. 6).

In operation 712, the processor 205 monitors the environment of the reader 105 to determine whether a credential 112 has been placed within the read range of the reader 105.

In operation 715, the processor 205 determines whether the credential 112 has been placed within the read range prior to the timer 230 exceeding the threshold value. That is, the processor 205 determines whether activity at the credential interface 215 has been detected within the threshold amount of time, where the activity is the presentation of the credential 112 to the reader 105. The threshold amount of time may be the same as the threshold amount of time referred to in operation 615.

In operation 720, the processor 205 enters the second mode of operation if the credential 112 is placed within the read range within the threshold amount of time in operation 715 (i.e., activity at the credential interface 220 is detected). The second mode of operation may be the same as the second mode of operation discussed with reference to FIGS. 1-6.

In operation 725, the processor 205 sets an indicator to indicate that the second mode has been entered. The indicator may be the same indicator as discussed above with reference to operation 620.

If, in operation 715, the processor 205 does not detect that the credential 112 has been placed within the read range prior to the timer 230 exceeding the threshold value (i.e., activity at the credential interface 220 is not detected), the processor 205 proceeds with operation 730 and references the indicator that was set by operation 620. That is, subsequent to the reconnecting of operation 705, the processor 205 references the indicator after the timer 230 exceeds the threshold value. In other words, the indicator set is in the memory 210 (which is a non-volatile memory) and is referenced after the access control reader 105 is disconnected from the power source 120 and then connected to another power source or reconnected to the power source 120.

Then, in operation 735, the processor 205 causes the access control reader 105 to operate in either the first operation mode or the second operation mode based on the referenced indicator. For example, with reference to operation 620, if the indicator has a value of '0' then the processor 205 causes the reader 105 to enter the first mode. If the value of the indicator is a '1' then the processor 205 causes the reader 105 to enter the second mode.

In operation 740, the processor 205 shortens the threshold amount of time. For example, the processor 205 references the indicator, and based on the reference to the indicator, shortens the threshold amount of time (or decreases threshold value) for making subsequent decisions of whether or not to operate the access control reader 105 in the first mode of operation or the second mode of operation. However, example embodiments are not limited thereto as the processor 205 may lengthen the threshold amount of time (or increase the threshold value) based on the reference to the indicator. For example, in addition to indicating a mode of the reader 105, the indicator may include information about how many times the indicator has been referenced since a most recent change between modes of the reader 105. For example, if the indicator has been referenced more than a threshold number of times without changing values, then the processor 205 may shorten the threshold amount of time (or decrease the threshold value) so that subsequent determinations of the operation mode are resolved faster (e.g., after power interruptions). In another example, if the indicator has been referenced less than a threshold number of times (or changes from a first value (e.g., 0) to a second value (e.g., 1), thereby indicating a change in mode), then the processor 205 may lengthen the threshold amount of time (or increase the threshold value) so that more time is allowed for determining possible changes to the operation mode.

Although the operations of FIGS. 6 and 7 have been described with respect to the processor 205 of the reader 105, it should the understood that the operations may be carried out by other elements of the system 100, for example, by the processor 240 of the access control panel 115. In this case, the instructions shown in FIG. 4 are stored on memory 245 and the access control panel 115 may further include a timer identical to the timer 230 of reader 105.

In view of the foregoing description, it should be appreciated that example embodiments provide methods and devices to combine and auto-configure two types of protocols/wiring standards (OSDP/RS485 and Wiegand) for an RFID system.

While illustrative example embodiments of the disclosure have been described in detail herein, it is to be understood that the inventive concepts may be otherwise variously embodied and employed, and that the appended claims are intended to be construed to include such variations.

What is claimed is:
1. An access control reader, comprising:
a credential interface that facilitates communications between the access control reader and at least one credential;
a network interface that facilitates communications between the access control reader and at least one other network device;
a processor coupled to the credential interface and the network interface; and computer memory coupled with the processor and comprising instructions that are executable by the processor, the instructions comprising:
    instructions to determine that the access control reader has been connected to a power source;
    instructions to monitor activity at the credential interface after the access control reader has been connected to the power source; and
    instructions that cause the access control reader to enter either a first mode of operation or a second mode of operation dependent upon whether or not activity is detected at the credential interface within a threshold amount of time after the access control reader has been connected to the power source;
    wherein the first mode of operation corresponds to a first communications protocol used by the network interface to communicate with the at least one other network device and the second mode of operation corresponds to a second communications protocol used by the network interface to communicate with the at least one other network device.

2. The access control reader of claim 1, wherein the first communications protocol is used to conduct bi-directional communications with the at least one other network device.

3. The access control reader of claim 2, wherein the first communications protocol is OSDP (Open Supervised Device Protocol).

4. The access control reader of claim 1, wherein the second communications protocol is used to conduct unidirectional communications with the at least one other network device.

5. The access control reader of claim 4, wherein the second communications protocol is Wiegand.

6. The access control reader of claim 1, wherein the at least one other network device comprises a control panel that assists the access control reader in making access control decisions with respect to credentials presented to the credential interface of the access control reader.

7. The access control reader of claim 1, wherein the access control reader enters the second mode of operation in response to detecting activity at the credential interface within the threshold amount of time, and wherein the access control reader enters the first mode of operation in response to failing to detect activity at the credential interface within the threshold amount of time.

8. The access control reader of claim 7, wherein the first mode of operation corresponds to a default mode of operation.

9. The access control reader of claim 1, wherein the instructions further comprise:
    instructions that set an indicator in the memory to reflect whether the access control reader enters the first mode of operation or the second mode of operation.

10. The access control reader of claim 9, wherein the indicator set in the memory is stored in non-volatile memory and is referenced after the access control reader is disconnected from the power source and then connected to another power source or reconnected to the power source.

11. The access control reader of claim 10, wherein the instructions further comprise:
    instructions that reference the indicator, and based on the reference to the indicator, shorten the threshold amount of time for making subsequent decisions of whether or not to operate the access control reader in the first mode of operation or the second mode of operation.

12. A method of operating an access control reader, the method comprising:
    determining that the access control reader has been connected to a power source;
    starting a timer;
    monitoring an environment of the access control reader to determine whether a credential has been placed within a read range of the access control reader; and
    in the event that the credential is determined to be within the read range of the access control reader prior to the timer reaching a threshold value, causing the access control reader to operate in a second mode of operation rather than a first mode of operation which corresponds to a default mode of operation;
    wherein the access control reader conducts a first type of communications with a control panel of the access control reader in the first mode of operation; and
    wherein the access control reader conducts a second type of communications with the control panel in the second mode of operation.

13. The method of claim 12, wherein the first type of communications comprises OSDP (Open Supervised Device Protocol).

14. The method of claim 13, wherein the second type of communications comprises Wiegand.

15. The method of claim 12, further comprising:
    setting an indicator that indicates whether the access control reader is in the first mode of operation or the second mode of operation after the timer reaches the threshold value; and
    resetting the timer.

16. The method of claim 15, further comprising:
    detecting that the access control reader is disconnected from the power source;
    detecting that the access control reader is reconnected to the power source or to another power source;
    restarting the timer in response to detecting the reconnecting;
    subsequent to the reconnecting, monitoring the environment of the access control reader to determine whether the credential has been placed within the read range of the access control reader;
    in the event that the credential is determined to not be within the read range of the access control reader prior to the timer reaching the threshold value, referencing the indicator; and
    causing the access control reader to operate in either the first operation mode or the second operation mode based on the referenced indicator.

17. The method of claim 16, further comprising:
    shortening the threshold value based on the referenced indicator.

18. An access control system, comprising:
    an access control panel;
    a reader network; and
    an access control reader coupled to the access control panel via the reader network, wherein the access control reader comprises circuitry that enables the access control reader to automatically detect a type of protocol for the reader network based on whether or not a credential is presented to the access control reader within a threshold amount of time of the access control reader being installed and then operate in a mode of operation consistent with the detected type of protocol.

19. The access control system of claim 18, wherein the access control reader detects a first type of protocol if the credential is not presented to the access control reader within the threshold amount of time, and operates in a first mode of operation.

20. The access control system of claim 19, wherein the access control reader detects a second type of protocol if the credential is presented within the threshold amount of time, and operates in a second mode of operation.

\* \* \* \* \*